April 8, 1924.
E. O. SATHER
ACCELERATOR
Filed Aug. 26, 1922
1,489,673
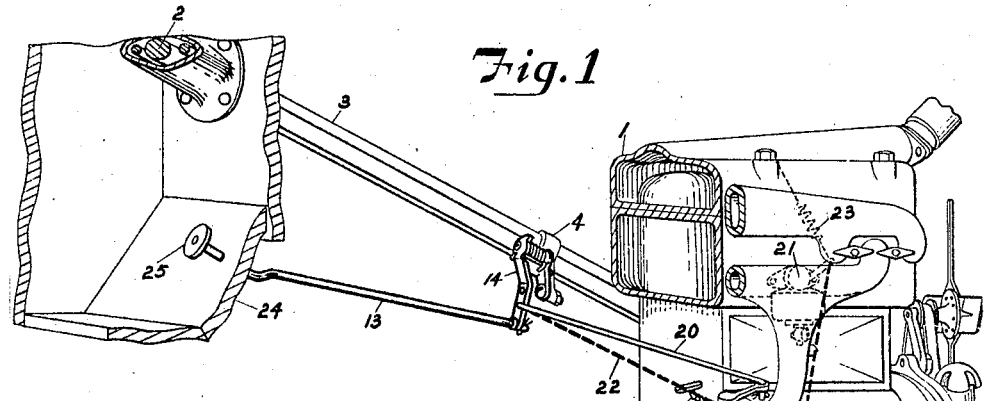
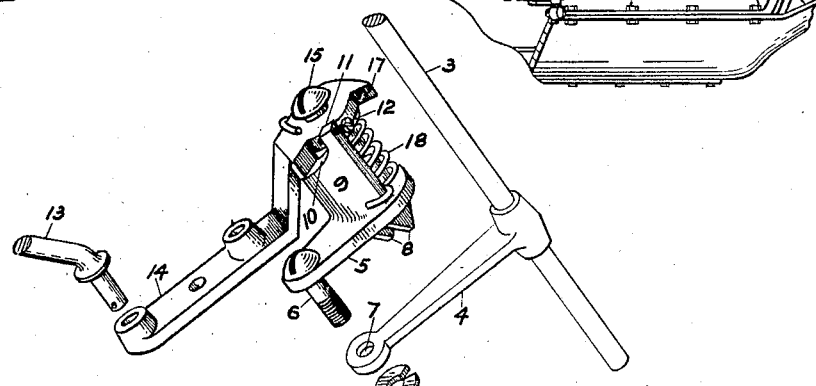
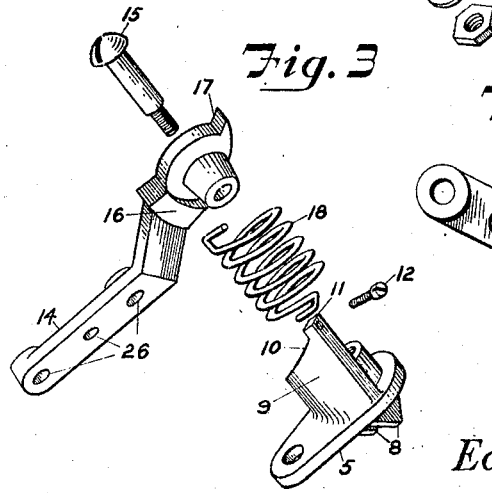
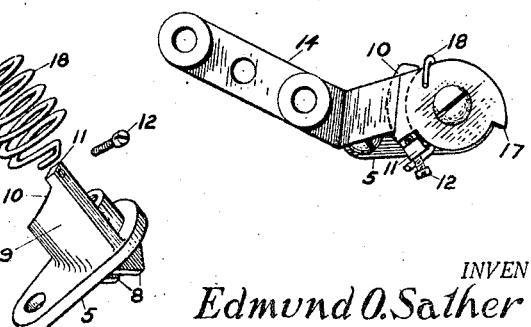
INVENTOR.
Edmund O. Sather
BY M. C. Frank
ATTORNEY Patented Apr. 8, 1924.

1,489,673

UNITED STATES PATENT OFFICE.

EDMUND O. SATHER, OF BERKELEY, CALIFORNIA, ASSIGNOR TO DORA C. WELCH, OF OAKLAND, CALIFORNIA.

ACCELERATOR.

Application filed August 26, 1922. Serial No. 584,504.

*To all whom it may concern:*

Be it known that I, EDMUND O. SATHER, a citizen of the United States, residing at Berkeley, in the county of Alameda and State of California, have invented a new and useful Accelerator, of which the following is a specification.

My invention relates to improvements in accelerators, and especially in foot-operated accelerators for automobiles for increasing the speed of the machine at will.

The majority of the present automobiles on the market, come equipped with both hand and foot-controlled mechanism for operating the engine throttle, but there are some makes of cars that come furnished with only the hand-controlled means for the throttle operation.

An operator of cars of both types, often becomes confused for the moment, thinking that he is driving the car having the combined hand and foot control, while he may be driving the car having the hand-controlled means only, or vice versa. The moment or two in discovering the difference may result in an accident, especially if the car is travelling fast.

Therefore, my prime object is to provide an attachment for those motor vehicles having only the hand-controlled means for controlling the speed of the vehicle, thereby making possible the control of all vehicles in a similar maner, that is, each car can be equipped with my invention, and thus have the combined hand and foot control.

Another object is to provide my attachment in the form of a foot-operated accelerator that can be used in conjunction with the hand-operated mechanism, thereby giving the desired foot control as well as the hand control over the engine throttle. Another object is to provide such a foot control that will not interfere with the ordinary hand control. And another object is to enable either the hand control or the foot control to be used at will, without touching the other. And still a further object is to provide an accelerator which can be easily installed, and which may be characterized by its extreme simplicity and few parts, and which can connect to the existing means leading from the hand-control throttle rod to the throttle lever of any type of carburetor. Other, and incidental objects will appear hereinafter.

In the accompanying one sheet of drawings I have illustrated my invention as applied to a Ford automobile.

Figure 1 is a perspective view, showing in light lines and partly in elevation and partly in section, a conventional Ford engine and a fragment of the foot board and contiguous parts of the vehicle, and in heavy lines my foot control attachment positioned with respect thereto.

Figure 2 is an enlarged perspective view, showing how my foot-control mechanism is connected to the existing lever on the throttle rod; the rod and lever being shown in light lines.

Figure 3 is a detail perspective, showing the parts of the mechanism of Figure 2 disassembled, but in position for assembly.

Figure 4 is a top view of the parts of Figure 3 assembled.

In the drawing and the figures thereof: A conventional Ford engine is represented at 1, 2 being the steering gear post of the vehicle, and 3 the usual hand-control throttle rod, for operating the throttle valve. 4 is the usual lever attached to the throttle rod 3.

Instead of connecting the throttle-rod lever 4 directly to the carburetor pull-rod 20 as is now customary, I provide a member 5, which I secure to the lever 4 by a bolt 6 entering the usual hole 7 at the end of the lever, and by a pair of lugs 8 which straddle the lever, thereby giving a rigid connection between the two parts. The member 5 is provided with an upstanding portion 9, whose upper edge is formed into a cam 10, having a stop-post 11 at the upper end thereof, with an adjusting screw 12 therein.

13 is my foot-control throttle rod pivotally secured to a foot-rod lever 14, which latter is pivotally mounted on member 5 by pivot screw 15. Concentric with the latter screw, a wall having a sloping surface 16 is provided on the underside of lever 14 adapted to slide upon the cam 10 of member 5. Also a stop-shoulder 17 is provided at the extremity of lever 14 to contact stop-post 11, which, when in contact, constitutes the limit of movement of lever 14 and throttle foot rod 13 when the throttle is wide open.

A spring 18 surrounding the pivot screw 15, keeps the lever 14 normally against the post 11 or its adjusting screw 12, but permits it to oscillate away from the same along the cam.

Lever 14 is connected to the carburetor throttle lever 19, as by carburetor pull-rod 20, pivoted to both of the said parts. In cases where the throttle is higher up, near the intake of the engine, for example, as shown in dotted lines in Figure 1 at 21, the connection thereto may be by a cord 22, with a spring 23 to react and hold the throttle valve of carburetor closed when pressure of the foot is released from the throttle foot rod 13, which extends back through the foot board 24 to a foot-button 25.

Foot-rod lever 14 may have a series of holes 26, any one of which may engage the extremity of foot-rod 13 or pull-rod 20 in adjustable relation, to suit the different lengths of travel of the foot-rod that may be desired, and also to provide means for a variable range of throws to throttle valve connective means to accommodate any type of throttle arm that may be used on the carburetor of the motor vehicle having my accelerator attached thereto.

In operation, a pressure of the foot on button 25, causes lever 14 to oscillate and slide down the cam 10, and this oscillation, through pull-rod 20 or the cord 22, actuates the throttle. The amount of opening of the latter, varying directly with the foot-pressure on the button. Similarly, an oscillation of the handle (not shown) of the hand-control throttle rod, rocks the rod 3 and lever 4 and connected parts, and, by means of pull rod 20, or cord 22, opens or closes the throttle. Thus, the throttle can be operated by the foot, leaving the hand free, or can be operated by the hand, leaving the foot free. When the foot-control is operated, the hand-control throttle rod and lever remain undisturbed. When pressure on the foot-button is released, the parts are returned to their normal positions by spring 18, and are then in position for another operation, by either the hand or the foot control.

In the drawings, I have shown but one specific form of my invention, but it is to be understood that the invention may be embodied in other different forms, each being a species of my invention, and the patent protection that I desire, is all of that which comes within the spirit and scope of what I claim as new, and which claims are the following:

1. An accelerator comprising a foot rod, a lever pivotally suspended at its upper end and connected below its pivot to the foot rod, means whereby pressure through the foot rod will effect oscillation of the lever, a member extending laterally from said lever at a point below its pivot to connect the lever with a carbureter throttle lever whereby said carbureter throttle lever may be operated by said foot rod, a hand-controlled rod, and means whereby rocking of the hand-controlled rod will oscillate the first-mentioned lever.

2. An accelerator comprising a lever projecting from the hand-control throttle rod, a member rigidly connected to said lever, said member having an upright portion with a cam edge, a lever pivotally mounted on said member adjacent said upright portion, and extending across and riding on said cam, said last named lever adapted for connection to the throttle and to a foot member.

3. An accelerator comprising a throttle-rod lever adapted for operation by hand control, a member rigidly secured to said lever, a lever pivotally mounted on said member and provided with a spring adapted to maintain a normal relation between said parts, said last named lever connected to a foot piece and adapted for operation by foot control, said last named lever adapted for connection to the carburetor throttle lever, whereby the throttle may be operated by either hand or foot.

4. The combination of a throttle, a hand-controlled rod carrying a relatively fixed lever, a foot-controlled rod, an oscillatory lever connected to said last-named rod, means whereby pressure through said foot-controlled rod will effect oscillation of the lever, a connection between said last-named lever and the throttle, means to pivotally support the oscillatory lever upon the fixed lever for independent movement substantially parallel therewith, means for limiting the independent movement of the oscillatory lever and actuating the same through movement of the hand-controlled rod and the relatively fixed lever, and means for yieldably holding the oscillatory lever in a set relation to the fixed lever.

5. An accelerator comprising a lever, a member provided with an upstanding portion whose upper edge is formed into a sloping cam, a spring interposed between the said parts and adapted to normally hold the lever to the cam, foot means adapted to push said lever down the slope of said cam against the pressure of said spring, said lever pivotally mounted on the member carrying the said cam, said member adapted to operatively connect to hand-controlled means and said lever operatively connected to foot-controlled means for operating an engine throttle.

6. In combination with the throttle rod and throttle-rod lever of a Ford automobile, a member supporting an upright having an inclined top and said member adapted to straddle and be rigidly connected to said lever, a foot-rod lever adapted to be pivotally supported on said member and said latter lever having an inclined under-surface adapted to slidably engage said inclined top, and foot means adapted to pivotally engage the latter lever, the said throttle-rod lever and member and foot-rod lever adapted to act in unison to open and close the automobile throttle, and said foot-rod lever further adapted to open and close the said throttle independent of said throttle-rod lever and member by the said foot means.

7. In an accelerator attachment for automobiles, two lever members pivotally secured together one above the other, each of said levers having a projecting wall concentrically positioned with respect to said pivot and provided with contacting and registering inclined edges, a coil-spring adapted to be positioned concentric to and between said pivot and walls, the upper lever adapted to slide downwardly on said incline by external pressure, and slide upwardly back to position by pressure from said spring.

8. An accelerator comprising a lever, hand-controlled means for rocking said lever, a second lever pivotally mounted on the first lever, foot-controlled means for rocking the second lever, means for connecting the second lever with a carbureter throttle, a spring disposed between and connecting the levers, and stop elements on the levers normally held in contact by the spring whereby the second lever may be rocked through actuation of the hand-controlled means or independently rocked by the foot-controlled means.

9. An accelerator comprising in combination with a carbureter throttle, a hand throttle rod and a lever projecting from said rod, a member rigidly secured to said lever, a second lever pivotally mounted on said member to oscillate in a plane parallel with the plane of the first-mentioned lever, foot-controlled means for oscillating the second-mentioned lever, a stop on said rigid member, means for yieldably holding the second-mentioned lever against said stop, and means for connecting the second-mentioned lever to the carbureter throttle.

10. The combination with a hand-controlled throttle rod and a lever thereon, of an attaching member adapted to fit against said lever, spaced lugs on said member to span the lever, means for securing said member rigidly to the lever, a second lever pivotally mounted on said attaching member, foot-controlled means for rocking the second lever, means for connecting the second lever with a carbureter throttle, stops on the second lever and the attaching member, and yieldable means for holding said stops normally in contact.

11. The combination with a hand-controlled throttle rod and a lever thereon, of an attaching member rigidly secured to the lever, a stop rising from said member, a second lever pivotally mounted on the attaching member, foot-controlled means for rocking the second lever, means for connecting the second lever with a carbureter throttle, and stops on the second lever at opposite sides of the stop on the attaching member and adapted to impinge against said stop to limit the independent movement of the second lever.

In testimony whereof I affix my signature.

EDMUND O. SATHER.